United States Patent
Spinaci et al.

(10) Patent No.: US 11,816,182 B2
(45) Date of Patent: Nov. 14, 2023

(54) CHARACTER ENCODING AND DECODING FOR OPTICAL CHARACTER RECOGNITION

(71) Applicant: SAP SE, Walldorf (DE)

(72) Inventors: Marco Spinaci, Le Chesnay (FR); Marek Polewczyk, Berlin (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 17/340,794

(22) Filed: Jun. 7, 2021

(65) Prior Publication Data

US 2022/0391637 A1    Dec. 8, 2022

(51) Int. Cl.
*G06F 18/214* (2023.01)
*G06V 30/28* (2022.01)

(52) U.S. Cl.
CPC .......... *G06F 18/214* (2023.01); *G06V 30/287* (2022.01)

(58) Field of Classification Search
CPC ................ G06F 18/214; G06V 30/287; G06V 30/19127; G06V 30/19147
USPC ......................................................... 382/161
See application file for complete search history.

(56) References Cited

U.S. PATENT DOCUMENTS

| | | | |
|---|---|---|---|
| 9,189,694 B2 * | 11/2015 | Tonogai | G06V 30/224 |
| 11,210,506 B2 * | 12/2021 | Kawabe | G06V 30/412 |
| 2018/0364905 A1 * | 12/2018 | Putko | G06F 3/04886 |

* cited by examiner

*Primary Examiner* — Neil R Mclean
(74) *Attorney, Agent, or Firm* — Fountainhead Law Group P.C.

(57) ABSTRACT

The present disclosure provides techniques for encoding and decoding characters for optical character recognition. The techniques involve determining sets of numbers for encoding a character set where each number in a particular set of numbers for encoding a particular character is mapped to a graphical unit (e.g., radical) of the particular character. A mapping between each set of numbers in the possible encodings and the character set may be determined based the closest character already encoded. A machine learning model may be trained to perform optical character recognition using training data labeled using the set of encodings and the mappings.

20 Claims, 8 Drawing Sheets

| Key | Radical | Key | Radical | Key | Radical | Key | Radical | Key | Radical |
|---|---|---|---|---|---|---|---|---|---|
| A | 日 | F | 火 | K | 大 | P | 心 | U | 山 |
| B | 月 | G | 土 | L | 中 | Q | 手 | V | 女 |
| C | 金 | H | 竹 | M | 一 | R | 口 | W | 田 |
| D | 木 | I | 戈 | N | 弓 | S | 尸 | Y | 卜 |
| E | 水 | J | 十 | O | 人 | T | 廿 | X | 重/難 |

700

In Cangjie 人 戈 日 口
倉 is encoded as O I A R

| Graphical Unit | Cangjie Radical | Key Letter |
|---|---|---|
|  |  | O |
|  |  | I |
|  |  | A |
|  |  | R |

In Cangjie, 輸 is encoded as 十 十 人 一 弓
                              J  J  O  M  N

| Graphical Unit | Cangjie Radical | Key Letter |
|---|---|---|
| 輸 | 十 | J |
| 輸 | 十 | J |
| 輸 | 人 | O |
| 輸 | 一 | M |
| 輸 | 弓 | N |

*FIG. 8*

CHARACTER ENCODING AND DECODING FOR OPTICAL CHARACTER RECOGNITION

BACKGROUND

The present disclosure pertains to character encoding and decoding, and in particular to encoding and decoding of Chinese characters (used in both Chinese and Japanese written languages), or other lexigram or ideogram characters, that provides improved accuracy in optical character recognition (OCR). OCR is the process of digitally reading and identifying letters and characters in text from an image of the text (e.g., a scanned document, photo of a receipt, screenshot, etc.) and converting them into machine-encoded text. One of the initial steps in creating an OCR process is to encode the character set (e.g., Latin character set, Chinese character set, Greek character set, etc.). Some conventional OCR systems use deep learning neural network models to predict the encoded text corresponding to the image.

Encoding refers to the process of associating every character in the character set with a particular number or set of numbers. For example, the Unicode standard for encoding the Basic Latin script assigns the capital letter "A" to decimal number "65" (corresponding to hexadecimal code "U+0041"), the capital letter "B" to decimal number "66" (corresponding to hexadecimal "U+0042"), and the capital letter "C" to decimal number "67" (corresponding to hexadecimal code "U+0043"). Other encoding schemes for the Latin script also use one number per character. This approach may be referred to as an "enumeration" approach as each character is listed in a predetermined order, one by one, where each character may not have a strong relation or any relation to the character preceding, or the character following, it in the enumeration.

A compact encoding, such as Unicode encoding, may be used to predict a sequence of bits rather than a number when performing OCR. This encoding may allow for a larger vocabulary, but typically comes at a cost of lower accuracy. Furthermore, any character that is rarely (or never) seen in the training data may be difficult or impossible to predict. Or that rare character may be predicted in place of other characters.

"One-hot" encoding is another encoding scheme which is used in deep learning and in OCR. A "one-hot" is a group of bits where only one of the bits in the group is a "1" and all of the other bits in the group are 0. For example, a one-hot encoding of the colors "blue," "green," and "red" may encode "blue" as "001," "green" as "010," and "red" as "100." Using one-hot encoding in deep neural network models typically provides improved prediction accuracy compared to enumeration encoding since enumeration may assume a natural ordering between classifications where there is none.

Use of one-hot encoding in deep neural network models for OCR may be accurate. However, one-hot encoding may not be practical for performing OCR on a full-page level because the Chinese language script includes tens of thousands of characters in common use (e.g., 20,992 in the "common" Unicode block and thousands more in the other blocks) and over one hundred thousand characters if including historical characters. This many characters may not fit in memory when using one-hot encoding. And even if it did fit into memory, it would be impractically slow. For example, when performing OCR using an output resolution of 824× 1272, using 8,000 one-hot encoded classes (less than the 20,992 common Unicode Chinese characters), that would require 8,385,024,000 numbers, or around 32 GB of memory while typical GPUs may only have 16 GB of memory. And there are other layers of the neural network that would need to be stored in addition to the output layer.

Thus, the large number of characters in the Chinese character set may be problematic for some encoding approaches (e.g., the enumeration approach and one-hot approach) because classification models having such a large number of classes to predict may be slow or use more memory than typically available, as with one-hot encoding, or less accurate, as with enumeration based encoding. Furthermore, OCR of characters included in this range of Chinese characters but which are rarely used may have very low, or possibly zero, accuracy. In practice, OCR of Chinese characters is harder and has lower accuracy than OCR of Latin script text.

Accordingly, there is a need for improved accuracy and lower memory usage in recognizing and predicting characters in large characters sets (e.g., tens of thousands of characters) for optical character recognition. The present disclosure addresses these issues and others, as further described below.

SUMMARY

One embodiment provides a computer system comprising one or more processors and one or more machine-readable medium coupled to the one or more processors. The one or more machine-readable medium storing computer program code comprises sets of instructions executable by the one or more processors. The sets of instructions are executable to determine a plurality of character encodings mapping sets of numbers to a plurality of characters in a language character set. The plurality of characters are composed of a plurality of graphical units, where the different values of numbers in the sets of numbers corresponding to a different graphical unit of the plurality of graphical units. Each particular character of the plurality of characters is mapped to a particular set of the sets of numbers having values corresponding to a set of graphical units used in composing the particular character. The instructions are further executable to train a machine learning model using the plurality of character encodings. The machine learning model is configured to perform optical character recognition of the language character set.

Another embodiment provides one or more non-transitory computer-readable medium storing computer program code. The computer program code comprises sets of instructions to determine a plurality of character encodings mapping sets of numbers to a plurality of characters in a language character set. The plurality of characters are composed of a plurality of graphical units, where different values of numbers in the sets of numbers correspond to a different graphical unit of the plurality of graphical units. Each particular character of the plurality of characters is mapped to a particular set of the sets of numbers having values corresponding to a set of graphical units used in composing the particular character. The program code further comprises sets of instructions to train a machine learning model using the plurality of character encodings. The machine learning model is configured to perform optical character recognition of the language character set.

Another embodiment provides a computer-implemented method. The method comprises determining a plurality of character encodings mapping sets of numbers to a plurality of characters in a language character set. The plurality of characters are composed of a plurality of graphical units, where different values of numbers in the sets of numbers correspond to a different graphical unit of the plurality of graphical units, Each particular character of the plurality of characters is mapped to a particular set of the sets of numbers having values corresponding to a set of graphical units used in composing the particular character. The method further comprises training a machine learning model using the plurality of character encodings. The machine learning model is configured to perform optical character recognition of the language character set.

The following detailed description and accompanying drawings provide a better understanding of the nature and advantages of the present disclosure.

BRIEF DESCRIPTION OF THE DRAWINGS

FIG. 8 shows another exemplary encoding of a Chinese character using Cangjie, according to an embodiment.

DETAILED DESCRIPTION

Figure 1:
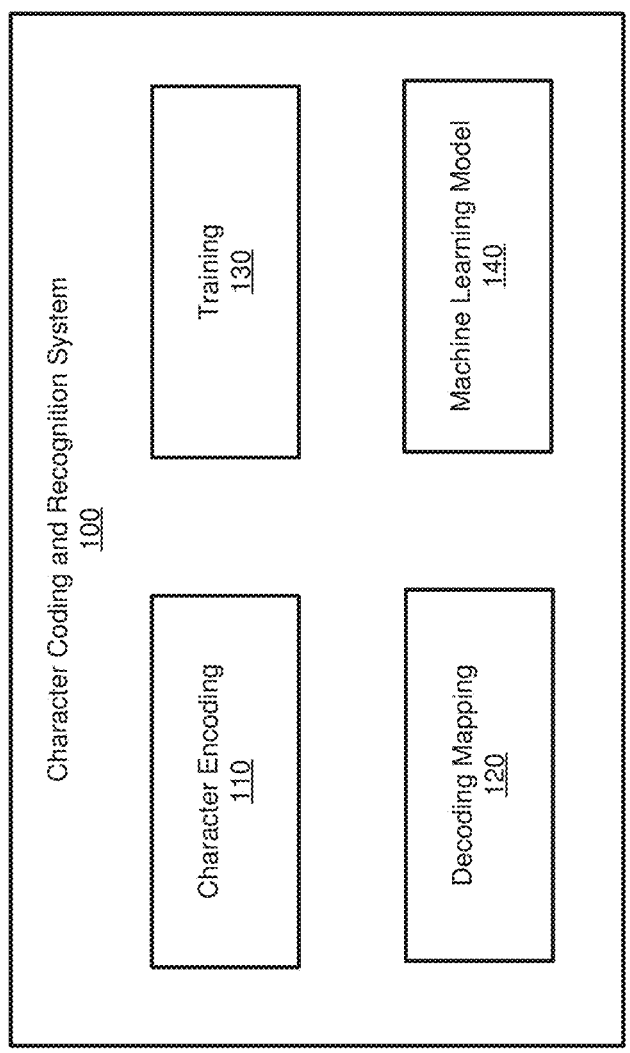
FIG. 1 shows a diagram of a character coding and recognition system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are: linked through one or more wired or wireless networks. Furthermore, ordinal terms such as "first," " "second," "third," "fourth," etc., used herein do not necessarily indicate an ordering or sequence unless indicated as these may merely be used to differentiate between objects or elements without specifying an order.

As mentioned above, encoding refers to the process of associating every character in the character set with a particular number or set of numbers. For example, a compact encoding such as Unicode encoding may be used to predict a sequence of bits rather than a number when performing OCR. This encoding may allow for a larger vocabulary, but typically comes at a cost of lower accuracy. Furthermore, any character that is rarely (or never) seen in the training data may be difficult or impossible to predict. Or that rare character may be predicted in place of other characters.

"One-hot" encoding is another encoding scheme which is used in deep learning and in OCR. A "one-hot" is a group of bits where only one of the bits in the group is a "1" and all of the other bits in the group are "0." For example, a one-hot encoding of the colors "blue," "green," and "red" may encode "blue" as "001," "green" as "010," and "red" as "100." Using one-hot encoding in deep neural network models typically provides improved prediction accuracy compared to enumeration encoding since enumeration may assume a natural ordering between classifications where there is none.

Use of one-hot encoding in deep neural network models for OCR may be accurate. However, one-hot encoding may not be practical for performing OCR on a full-page level because the Chinese language script includes tens of thousands of characters in common use (e.g., 20,992 in the "common" Unicode block and thousands more in the other blocks) and over one hundred thousand characters if including historical characters. This many characters may not fit in memory when using one-hot encoding. And even if it did fit into memory, it would be impractically slow. For example, when performing OCR using an output resolution of 824× 1272, using 8,000 one-hot encoded classes (less than the 20,992 common Unicode Chinese characters), that would require 8,385,024,000 numbers, or around 32 GB of memory while typical GPUs may only have 16 GB of memory. And there are other layers of the neural network that would need to be stored in addition to the output layer.

The present disclosure provides improves accuracy and reduces memory usage when performing OCR of characters (e.g., Chinese characters) using an encoding technique that similarly encodes characters having the same or similar graphical units (e.g., radicals or sub characters). FIG. 1 shows a diagram of a character coding and recognition system 100, according to an embodiment. The system 100 may be implemented by a computer system including one or more computing devices (e.g., server computers). These computing devices may each include one or more processors and non-transitory computer readable storage medium storing instructions to perform the encoding, machine learning training, optical character recognition, and other functions described herein. For example, the character coding and recognition system 100 may be implemented as the computer system described below with respect to FIG. 9.

The system 110 includes a set of character encodings 110 that encode a character set, such as the set of Chinese characters. Each encoding may be a set of numbers as further described below. The system 110 also includes a decoding mapping 120. The decoding mapping may be used to determine a character associated with a particular set of numbers. For instance, the number of possible encodings using the sets of numbers may be larger than the number of characters in the character set and the decoding mapping 120 may map each possible encoding (e.g., each different set of numbers) that is not yet used to encode a character to the next closest character, as further discussed below.

The system 100 also includes training data 130 for training a machine learning model 140 (e.g., deep learning neural network) to perform classification for optical character recognition. The training data 130 may be labeled based on the character encodings 110 and the decoding mapping 120. The training of the machine learning model and use of the model for machine learning inference in optical character recognition are further described below.

Figure 2:
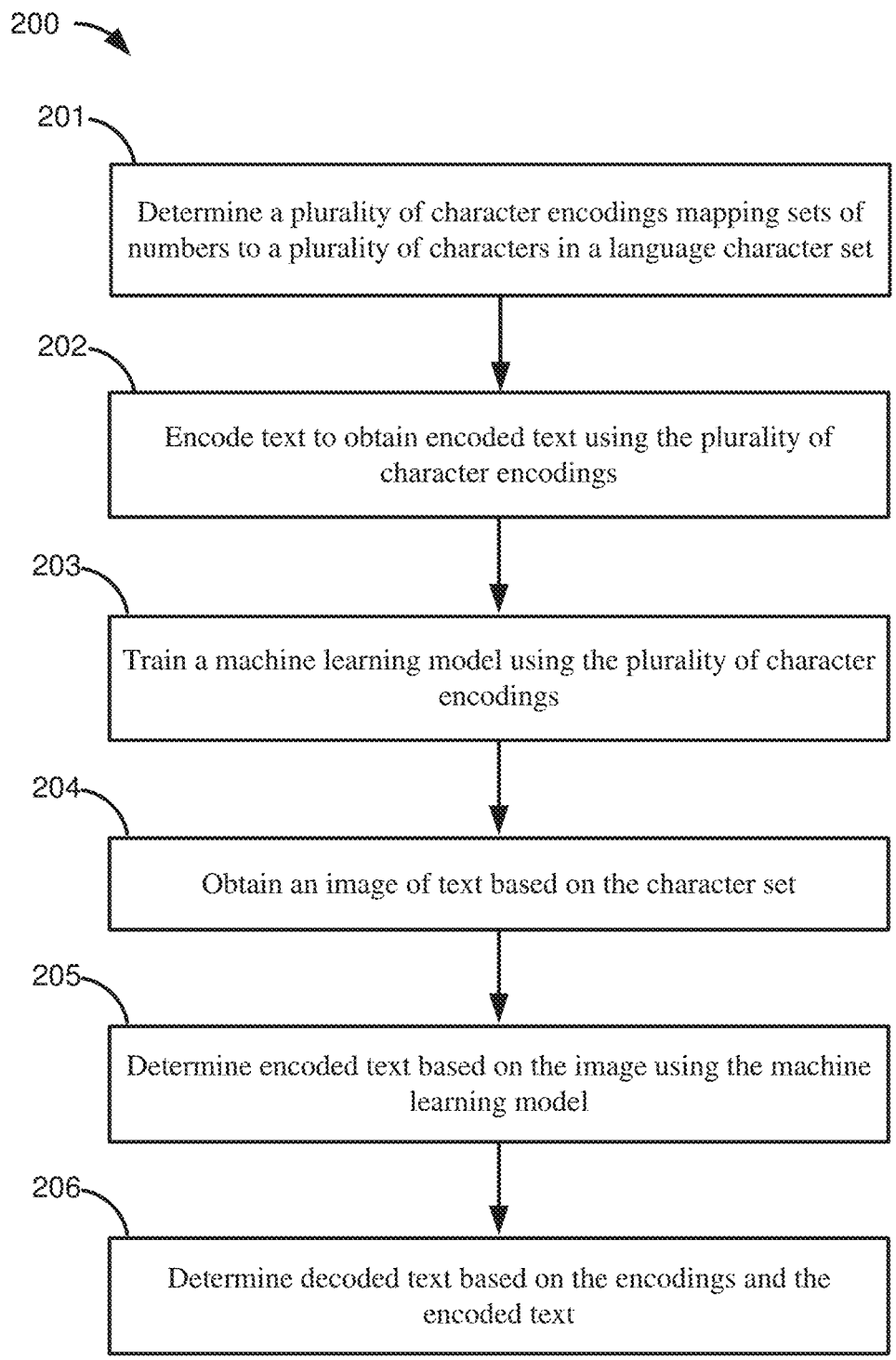
FIG. 2 shows a flowchart of a method for training and using a machine learning model for optical character recognition, according to an embodiment.

FIG. 2 shows a flowchart 200 of a method for training and using a machine learning model for optical character recognition. The method may be implemented by a computing system, such as the computer system described below with respect to FIG. 9. Portions of the method may be performed in a different order unless otherwise stated.

At 201, the method may determine a plurality of character encodings mapping sets of numbers to a plurality of characters in a language character set. For example, the characters may be Chinese characters in the Chinese language. The plurality of characters may be composed of a plurality of graphical units. For example, the graphical units may be "radicals," such as those in the Cangjie input method for entering Chinese characters using a keyboard. Note that the Cangjie input method is based on the graphological aspects of the characters, unlike other input methods such as the Pinyin input method, which is based on the pronunciation of the character. Thus, encodings in Cangjie, mapping letters on a keyboard to Chinese characters, use a similar set of letters/keys to encode visually similar characters.

The graphical units may represent a basic graphical component (e.g., different combinations of strokes, lines, curves, dots, and empty space). For example, the radicals in Cangjie are basic character components, each comprising one or more strokes. Cangjie uses 24 radicals and a collision/difficult character which are each mapped to a particular letter key on a standard QWERTY keyboard.

The different values of numbers in the sets of numbers may correspond to a different graphical unit of the plurality of graphical units. For example, the integer values of 0-24 for a number may defined to correspond to the twenty-four Cangjie radicals along with the collision (difficult) character in Cangjie, the radicals corresponding to letters A-Y on a keyboard, and a value of 25 for a number may be defined as an "empty" value for representing Cangjie encodings with fewer than five radicals.

Each particular character of the plurality of characters may be mapped to a particular set of the sets of numbers having values corresponding to a set of graphical units used in composing the particular character. For example, the Chinese character 倉 is encoded as OIAR in Cangjie, where O (number value 14) is mapped to radical 人, I (number value 8) is mapped to radical 戈, A (number value 0) is mapped to radical 日, and R (number value 17) is mapped to radical 口. This encoding in Cangjie is further described below with respect to FIG. 7.

Each of the sets of numbers comprises six numbers, for example, where five numbers of the six numbers correspond to five Cangjie radicals, or an indicator of an "empty" value (e.g., there are fewer than five radicals used), and one of the six numbers indicating a particular character encoded using the five numbers in a same order. The sixth number enables the encodings to differentiate between different characters that are composed using the same radicals but with differences or changes.

One example encoding of the Chinese character 倉 for use by a machine learning model is the set of five numbers: {14, 8, 0, 17, 25, 0}, where the value of 25 for the fifth number represents an empty value. The empty value may be used as this Cangjie encoding uses four letters out of a possible five letters used in Cangjie encodings. Each Cangjie encoding with fewer than five letters may be padded to five corresponding number values using the empty value. The sixth value being 0 may identify the character 倉, as opposed to another possible Chinese character composed of the radicals 人戈日口 (OIAR) using the Cangjie input method decomposition rules. For instance, in the Cangjie input method there may be up to five different characters having the same letter-encoding and so the value of the sixth number may be 0, 1, 2, 3, or 4 to indicate the five possible characters.

The sets of numbers may be ordered sets of numbers. The ordered sets may have an order that indicates the relative positions of the graphical units in a particular ordered set. For example, the direction of decomposition in Cangjie encoding is left to right, top to bottom, and outside to inside. Cangjie uses additional decomposition rules based on whether the forms are connected, unconnected, etc. Thus, the order for inputting the letters corresponding to the radicals depends on the relative position of the radicals within the Chinese character. The order of the numbers of a set of numbers used for encoding characters for OCR may be based on the Cangjie ordering and decomposition rules.

The encodings for OCR may use six numbers where five of the six numbers have integer values from 0-25 and the sixth number may have integer values from 0-4. This gives 59,406,880 ($26^5 \cdot 5$) possible sets of ordered numbers to use for encodings. That is, each of the sets of numbers for an encoding of a character may comprises six numbers, where five numbers of the six numbers corresponding to five Cangjie radicals, and one of the six numbers indicating a particular character encoded using the five numbers in a same order. As such, there may be more possible sets of ordered numbers compared to the number of characters in the character set (e.g., tens of thousands of characters in a common Chinese character set).

Given this encoding technique, there are sets of numbers that may represent Cangjie radicals in positions that do not correspond to any Chinese character. That is, one or more of the ordered sets of numbers may correspond to graphical units in relative positions that are not used in composing any particular character of the plurality of characters. In such embodiments, the plurality of character encodings map the one or more of the ordered sets of numbers to respective closest characters of the language character set based on a distance between their respective values. Thus, each Chinese character may be mapped to more than one set of numbers in the encodings. In the example above having 59,406,880 possible encodings, some of the Chinese characters may be mapped to thousands of encodings.

Further examples of mapping a particular character to a set of numbers is described below with respect to FIGS. 5-8.

Before training a machine learning model, the underlying training data used to train is obtained. At 202, the method may encode text to obtain encoded text using the plurality of character encodings. The encodings may be based on the Cangjie input method for entering Chinese characters into a computer using a keyboard as described herein. For instance, the text may be "ground truth text" including both character images together with indications of the known characters in the images. That is, the image data is labeled with the correct characters. The characters may be encoded using the techniques described below such that the machine learning model outputs these encodings when new images are applied to the trained model. Thus, the training of the machine learning model is based on the encodings and it is further based on images corresponding to the text and the encoded text.

At 203, the method may train a machine learning model using the plurality of character encodings. For instance, the character encodings may be used to label the text corresponding to the image of the text.

After training, the machine learning Model may perform accurate optical character recognition of the language character set. At 204, the method may obtain an image of text based on the character set. This new image data may be input to the model.

At 205, the method may determine encoded text based on the image using the machine learning model. This is refereed to as machine learning inference. It is the process of running new data into a machine learning model to calculate an output such as a single encoding.

At 206, the method may determine decoded text based on the encodings and the encoded text. For example, the encoded text output by the machine learning model (encoded as described herein) may be converted to Unicode or another common text format, which may be referred to as decoded text.

Figure 3:
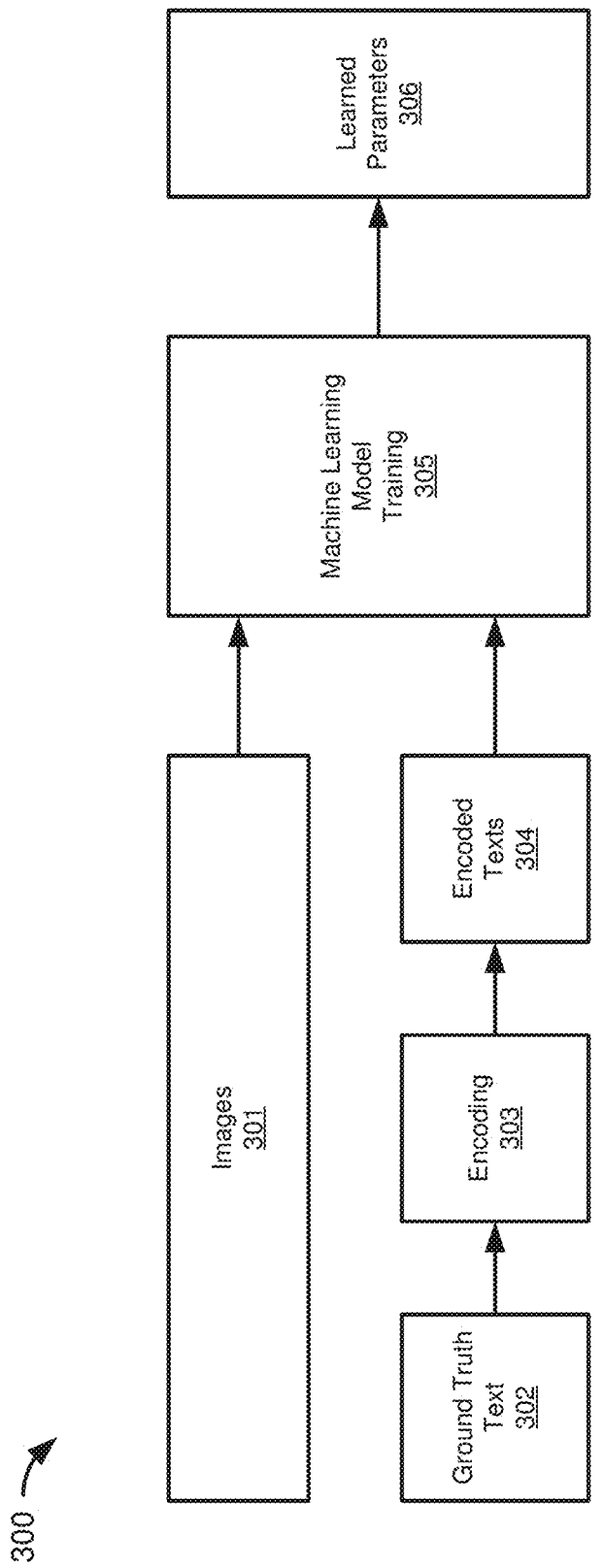
FIG. 3 shows a diagram of training a machine learning model, according to an embodiment.

FIG. 3 shows a diagram 300 of training a machine learning model, according to an embodiment. The description of training a machine learning model with respect to FIG. 3 expands upon the description of machine learning training given above with respect to FIG. 2. The machine learning training technique shown in FIG. 3 may be performed by the character coding and recognition system 100, for example.

Before training a machine learning model, images 301 and ground truth text 302 corresponding to the images 301 are obtained. The ground truth text 302 may be formatted as decoded text (e.g., in the Unicode format). An encoding 303 process may be performed on the ground truth text 302 in order to obtain encoded texts 304. The encoding process 303 may use the character encoding techniques and format described herein.

Then machine learning model training 305 is performed using the images 301 and the encoded texts 304 corresponding to those images 301. In supervised machine learning, a machine learning algorithm (e.g., a neural network algorithm) builds a model (e.g., neural network) by examining labeled examples (e.g., images labeled with encoded text) and attempting to find weights (e.g., weights applied to edges in a neural network) for the model that minimizes losses (e.g., prediction errors). The training 305 based on the input data results in a set of learned parameters 306 (e.g., the weights that minimize prediction errors).

Figure 4:
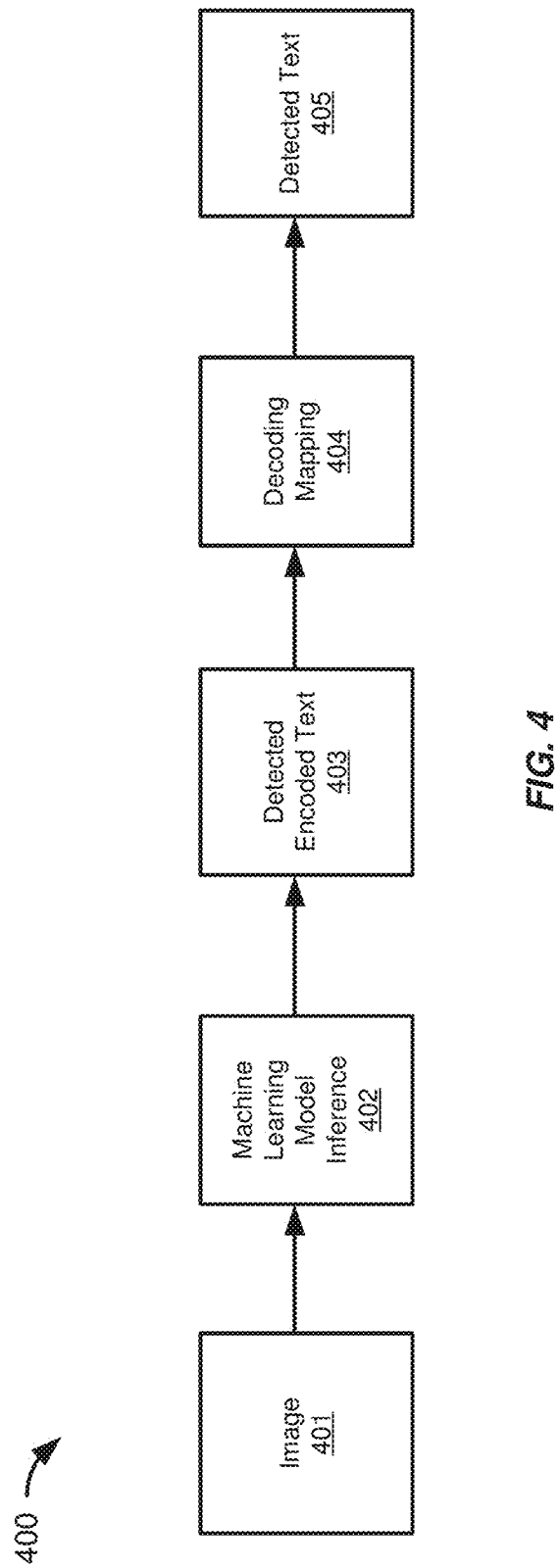
FIG. 4 shows a diagram of optical character recognition, according to an embodiment.

FIG. 4 shows a diagram 400 of optical character recognition, according to an embodiment. The description of optical character recognition with respect to FIG. 4 expands upon the description of machine learning inference given above with respect to FIG. 2. The optical character recognition technique shown in FIG. 4 may be performed by the character coding and recognition system 100, for example.

Optical character recognition refers to the electronic conversion of images of typed, handwritten or printed text into machine-encoded text. To perform optical character recognition, images 401 are obtained and provided or applied as input to a machine learning model 402 that performs inference. The machine learning model 402 may be trained as discussed above. The output of the machine learning model based on the images 401 is detected encoded text 403. That is, the predicted text according to the machine learning model. The encoded text 403 may be encoded as described below. The encoded text 403 may then be converted, using decoding mapping 404, into detected text 405. The decoding mapping 404 may be a mapping of sets of numbers to particular characters in a character set as described herein. The detected text may be refereed to as decoded text. In some embodiments, the detected text 405 may be formatted using Unicode.

Figures 5, 6:
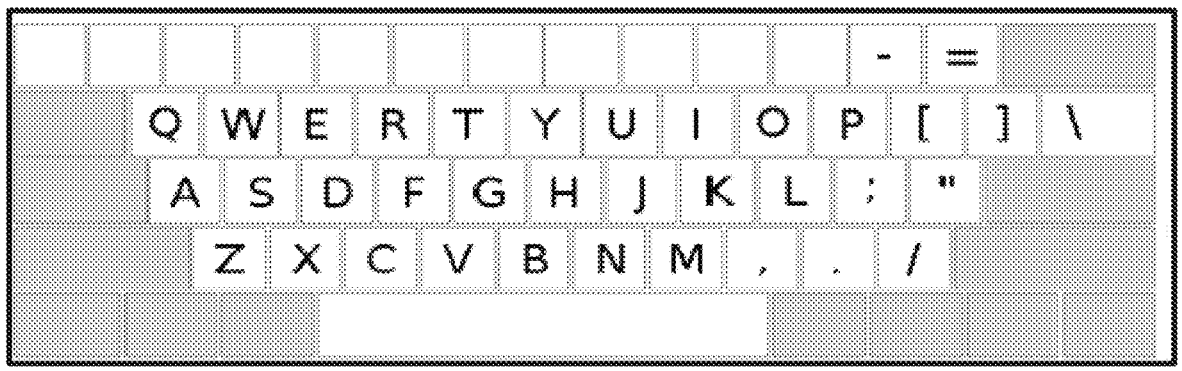
FIG. 5 shows a diagram of a character input method on a keyboard, according to an embodiment.
FIG. 6 shows a table mapping Chinese character radicals to Latin letter keys, according to an embodiment.

FIG. 5 shows a diagram 500 of a character input method on a keyboard, according to an embodiment. The diagram 500 shows a typical QWERTY keyboard having 26 latin characters and other punctuation marks which may be used in the English language, for example. Such keyboards are common and there has been a need for such keyboards to input Chinese characters. The Cangjie input method maps letters (keys) of a keyboard (whether QWERTY or another arrangement) to radicals. A series of latin characters (keys of a keyboard) may be used to encode a set of radicals, which represent particular Chinese characters. As mentioned above, the encodings may be determined such that each number in a particular set of numbers for encoding a particular character is mapped to a graphical unit (e.g., radical) of the particular character. The Cangjie input method may be used to encoding Chinese characters in this manner.

FIG. 6 shows a table 600 mapping Chinese character radicals to Latin letter keys, according to an embodiment. The radicals shown in FIG. 6 are based on the Cangjie method. In some embodiments, other radicals or mappings may be used. The Cangjie input method may be advantageous for OCR encoding purposes because it is visual, therefore making (whenever possible) a direct link between the image depiction of the character and the encoding. Cangjie is based on identifying 25 "base" radicals that are linked to the letters from A to Y.

Figure 7:
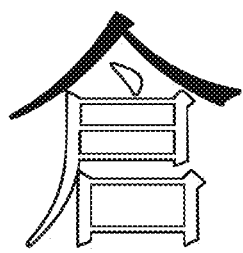
FIG. 7 shows an exemplary encoding of a Chinese character using Cangjie, according to an embodiment.
Figure 7:
Figure 7:
Figure 7:
Figure 7:
Figure 7:
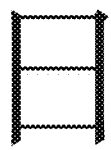
Figure 7:
Figure 7:
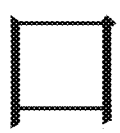

Examples of how radicals within a Chinese character are mapped to a sequence of letters (keys) in the Cangjie input method is shown in FIG. 7 and FIG. 8. In these examples, the filled in portions (e.g., black) of the characters and the radicals are used to show mappings of radicals to the corresponding graphical units of the character. In Cangjie, each Chinese character is then mapped to up to five such radicals by decomposing it top-to-bottom and left-to-right.

FIG. 7 shows an exemplary encoding 700 of a Chinese character using Cangjie, according to an embodiment. Note that the Cangjie-encoding of Latin letters (keys) to radicals is distinct from the encodings for use in the machine learning model in which sets of numbers are mapped to characters in a character set. The Cangjie encoding using letters may be converted into a set of numbers as described below (e.g., Latin letters/keys A-Y may correspond to integer number values 0-25).

In the example shown in FIG. 7, the Chinese character 倉 is encoded as OIAR in Cangjie. The letter O is mapped to radical 人, letter I is mapped to radical 戈, letter A is mapped to radical 日, and letter R is mapped to radical 口. Cangjie includes decomposition rules to set the order in which to type the letters based on the relative location and positions of the radicals in the Chinese character. The same or similar decomposition rules for setting the order of the encoding may be used in the encodings used to train a machine learning model for performing OCR.

FIG. 8 shows another exemplary encoding 800 of a Chinese character using Cangjie, according to an embodiment. In this example, the Chinese character 檢 is mapped to JJOMN, where J is mapped to radical 十, O is mapped to radical 人, M is mapped to radical 一, and N is mapped to radical 弓.

Cangjie provides the method to encode any Chinese character. Using this encoding, an OCR machine learning model (e.g., a deep learning model) may be training to predict the up-to-five characters, which in turn can be mapped to an integer. Referring back to the Cangjie table in FIG. 4, the character is mapped to 5 numbers between 0 and 25, where 0 represents "A", 1 represents "B", and so on up to 24 representing "Y." The $25^{th}$ number may be reserved for "empty" to represent Cangjie encodings with fewer than 5 radicals. The $25^{th}$ number may also be used in the first position to encode punctuation and other non-textual characters used to write Chinese and Japanese. It may also be used to store textual information that is not written in Chinese characters, such as Roman letters (occasionally used in both Chinese and Japanese documents) or Hiragana/Katakana letters (used in writing Japanese).

In Cangjie encoding it is possible for multiple characters to encode to the same Cangjie encoding. This may happen when characters have the same radicals in a different order or placement, or because they differ on a part which is not represented in the encoding. As shown in FIG. 5 and FIG. 6, not all portions of the character may be represented by a radical in the encoding. An example of the former case are the two characters 倗 and 內 both represented by 人月 (OB). One example in the latter case are the two characters 遙 and 遥 both encoded as 卜月人山 (YBOU). To distinguish between these cases, a final integer between 0 and 4 is added. In each case, 0 may represent the most common variant (in a given large corpus of Chinese text), 1 may represent the second most common variant, and so on. In total, this gives nearly 60 million combinations:

$$26^5 \cdot 5 = 59406880.$$

While the Chinese character set is large (e.g., tens of thousands of characters), the set of such encodings is much larger (e.g., 59,406,880). In OCR applications, these encodings may be predicted by error-prone machine learning algorithms and it is likely that the predicted encoding may not match to any known (encoded) character. All possible encodings may be mapped to a character in the character set. The following algorithm to decode a generic encoding $c_1 c_2 c_3 c_4 c_5 d$, where $0 \leq c_i \leq 25$ and $0 \leq d \leq 4$:

If d>0, replace by d=0 (i.e. take the most common variant). If then $c_1 c_2 c_3 c_4 c_5 0$ matches a known character, accept it and stop.

Otherwise, select the combination $c_1' c_2' c_3' c_4' c_5'$ that represents a valid character (e.g., one of the characters that was chosen to be encoded beforehand) and that has the largest number of characters in common with $c_1 c_2 c_3 c_4 c_5$, i.e. such that the amount of i with $c_i = c_i'$ is the largest possible. That is, the character that is the shortest distance away.

If two or more such combinations exist, give more weight to lower indices. That is, between two combinations $c_1' c_2 c_3 c_4 c_5$ and $c_1 c_2 c_3' c_4 c_5$ with both $c_1' \neq c_1$ and $c_3' \neq c_3$, the second one would be chosen, because both agree with the predicted encoding on 4 out of 5 characters, but the second one agrees on the "more important" first index.

Using the above algorithm, each new combination may be compared against all of the previously encoded characters supported characters) in order to compute their distance to determine which character to map the set of numbers of the encoding to. The distance may be determined based on the differing number of characters, where the characters are order-weighted to break ties. The mapping may not need to be stored it active memory. It may be stored (e.g., on a hard disk) and later retrieved when needed during OCR. Storing the mapping of around 60 million encodings to characters may take approximately 200 MB of storage, which may easily be handled on modern hardware. Therefore, the mapping may be computed offline and stored to be used online later. Depending on the amount of available RAM at computation time, this can be either stored in-memory, or dumped to a database on the hard drive (or other physical storage) and quickly retrieved online.

The encoding techniques described above provide advantages over prior encoding techniques such as the enumeration technique and one-hot encoding. For example, features and advantages of the present disclosure include allowing a larger set of characters to be encoded compared to prior methods (e.g., by using Cangjie codes for most, if not all, known Chinese characters). Another advantage is a higher accuracy than arbitrary encoding (e.g., as in Unicode) due to visually similar characters being mapped to similar strings, redundant encoding, and error-correcting decoding. Another advantage is higher accuracy on rare characters compared to one-hot encoding since with one-hot encoding the rare characters are either entirely discarded or too rarely met to be learnt well. Another advantage is a higher accuracy compared to prior encoding methods using glyph-aware binary encodings for logographic scripts in deep learning models, especially on rarer characters, where the learned encoding may be wrong. Another advantage is that errors are more meaningful than in prior approaches when the deep learning model makes an error in recognizing a character because the incorrect character may look visually similar to the correct character. For example, in the example above of two characters 遙 and 遥 sharing the same Cangjie encoding 卜月人山, they also share the same meaning ("remote" in English). Another advantage is that these techniques provide faster decoding than the glyph-aware binary encodings approach, which may require a high dimensional comparison on many bits. The manageable number of the possible combinations (roughly 60 millions) makes it feasible to store all decodings in a database, or even in-memory. This makes decoding virtually as fast as one-hot encoding and arbitrary order encoding (e.g., Unicode).

Figure 9:
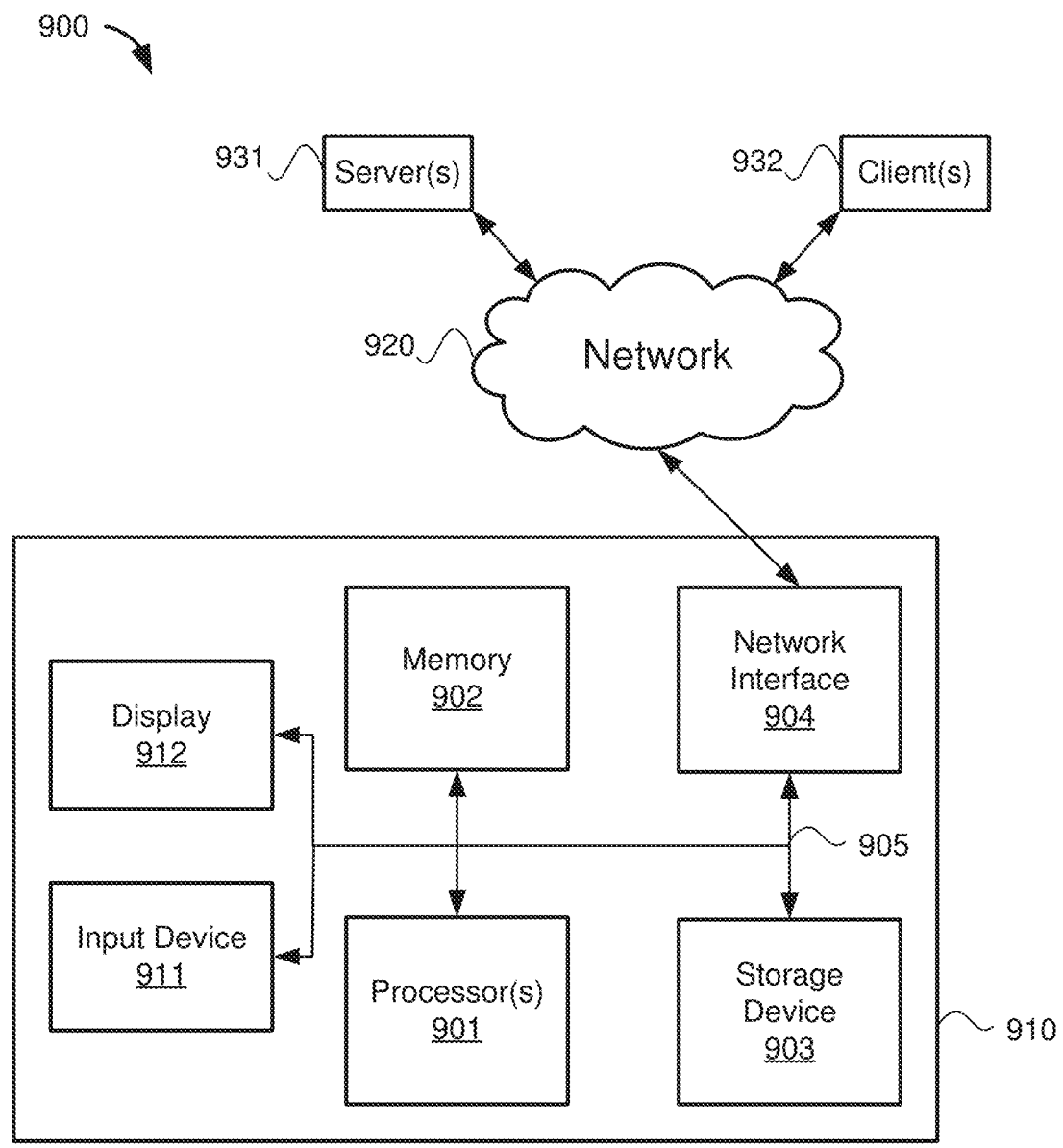
FIG. 9 shows a diagram of hardware of a special purpose computing machine for implementing systems and methods described herein.

FIG. 9 shows a diagram 900 of hardware of a special purpose computing machine for implementing systems and methods described herein. A computer system 910 includes a bus 905 or other communication mechanism for communicating information, and one or more processors 901 coupled with bus 905 for processing information. The computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, such as the processes described above, for example. Storage device and memory are both examples of non-transitory computer readable storage mediums.

The computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

The computer system also includes a network interface 904 coupled with bus 905. The network interface 904 may provide two-way data communication between computer system 910 and a network 920. The network interface 904 may be a wireless or wired connection, for example. The computer system 910 can send and receive information through the network interface 904 across a local area network, an Intranet, a cellular network, or the Internet, for example. In the Internet example, a browser, for example, may access data and features on backend systems that may reside on multiple different hardware server computers 931 and/or hardware client computers 932 across the network 920. The servers 931 and clients 932 may be part of a cloud computing environment, for example.

ADDITIONAL EMBODIMENTS

Additional embodiments of the present disclosure are further described below.

One embodiment provides a computer system comprising one or more processors and one or more machine-readable medium coupled to the one or more processors. The one or more machine-readable medium storing computer program code comprises sets of instructions executable by the one or more processors. The sets of instructions are executable to determine a plurality of character encodings mapping sets of numbers to a plurality of characters in a language character set. The plurality of characters are composed of a plurality of graphical units, where the different values of numbers in the sets of numbers corresponding to a different graphical unit of the plurality of graphical units. Each particular character of the plurality of characters is mapped to a particular set of the sets of numbers having values corresponding to a set of graphical units used in composing the particular character. The instructions are further executable to train a machine learning model using the plurality of character encodings. The machine learning model is configured to perform optical character recognition of the language character set.

In some embodiments of the computer system, the sets of instructions are further executable by the one or more processors to encode text to obtain encoded text using the plurality of character encodings. The training of the machine learning model is further based on images corresponding to the text and the encoded text.

In some embodiments of the computer system, the sets of instructions are further executable by the one or more processors to obtain an image of text based on the character set. The instructions are further executable to determine encoded text based on the image using the machine learning model. The instructions are further executable to determine decoded text based on the encodings and the encoded text.

In some embodiments of the computer system, the encodings are based on a Cangjie input method for entering Chinese characters into a computer using a keyboard and the plurality of graphical units correspond to radicals of the Cangjie input method. In some such embodiments, each of the sets of numbers comprises six numbers, five numbers of the six numbers corresponding to five Cangjie radicals, and one of the six numbers indicates a particular character encoded using the five numbers in a same order.

In some embodiments of the computer system, the sets of numbers are ordered sets of numbers having an order indicating relative positions of graphical units in a particular ordered set. In some such embodiments, one or more of the ordered sets of numbers correspond to graphical units in relative positions that are not used in composing any particular character of the plurality of characters. In such embodiments, the plurality of character encodings mapping the one or more of the ordered sets of numbers to respective closest characters of the language character set based on a distance between their respective values.

Another embodiment provides one or more non-transitory computer-readable medium storing computer program code. The computer program code comprises sets of instructions to determine a plurality of character encodings mapping sets of numbers to a plurality of characters in a language character set. The plurality of characters are composed of a plurality of graphical units, where different values of numbers in the sets of numbers correspond to a different graphical unit of the plurality of graphical units. Each particular character of the plurality of characters is mapped to a particular set of the sets of numbers having values corresponding to a set of graphical units used in composing the particular character. The program code further comprises sets of instructions to train a machine learning model using the plurality of character encodings. The machine learning model is configured to perform optical character recognition of the language character set.

In some embodiments of the non-transitory computer-readable medium, the computer program code further comprises sets of instructions to encode text to obtain encoded text using the plurality of character encodings. The training of the machine learning model is based on images corresponding to the text and the encoded text.

In some embodiments of the non-transitory computer-readable medium, the computer program code further comprises sets of instructions to obtain an image of text based on the character set. The computer program code further comprises sets of instructions to determine encoded text based on the image using the machine learning model. The computer program code further comprises sets of instructions to determine decoded text based on the encodings and the encoded text.

In some embodiments of the non-transitory computer-readable medium, the encodings are based on a Cangjie input method for entering Chinese characters into a computer using a keyboard. In such embodiments, the plurality of graphical units correspond to radicals of the Cangjie input method. In some such embodiments, each of the sets of numbers comprises six numbers, where five numbers of the six numbers correspond to five Cangjie radicals, and one of the six numbers indicates a particular character encoded using the five numbers in a same order.

In some embodiments of the non-transitory computer-readable medium, the sets of numbers are ordered sets of numbers having an order indicating relative positions of graphical units in a particular ordered set. In some such embodiments, one or more of the ordered sets of numbers correspond to graphical units in relative positions that are not used in composing any particular character of the plurality of characters. In such embodiments, the plurality of character encodings map the one or more of the ordered sets of numbers to respective closest characters of the language character set based on a distance between their respective values.

Another embodiment provides a computer-implemented method. The method comprises determining a plurality of character encodings mapping sets of numbers to a plurality of characters in a language character set. The plurality of characters are composed of a plurality of graphical units, where different values of numbers in the sets of numbers correspond to a different graphical unit of the plurality of graphical units. Each particular character of the plurality of characters is mapped to a particular set of the sets of numbers having values corresponding to a set of graphical units used in composing the particular character. The method further comprises training a machine learning model using the plurality of character encodings. The machine learning model is configured to perform optical character recognition of the language character set.

In some embodiments of the computer-implemented method, the method further comprises encoding text to obtain encoded text using the plurality of character encodings. The training of the machine learning model is further based on images corresponding to the text and the encoded text.

In some embodiments of the computer-implemented method, the method further comprises obtaining an image of text based on the character set. In such embodiments, the method may further comprise determining encoded text based on the image using the machine learning model. In such embodiments, the method may further comprise determining decoded text based on the encodings and the encoded text.

In some embodiments of the computer-implemented method, the encodings are based on a Cangjie input method for entering Chinese characters into a computer using a keyboard, where the plurality of graphical units correspond to radicals of the Cangjie input method. In some such embodiments, each of the sets of numbers comprises six numbers, where five numbers of the six numbers corresponding to five Cangjie radicals, and one of the six numbers indicating a particular character encoded using the five numbers in a same order.

In some embodiments of the computer-implemented method, the sets of numbers are ordered sets of numbers having an order indicating relative positions of graphical units in a particular ordered set. In such embodiments, one or more of the ordered sets of numbers may correspond to graphical units in relative positions that are not used in composing any particular character of the plurality of characters. In such embodiments, the plurality of character encodings map the one or more of the ordered sets of numbers to respective closest characters of the language character set based on a distance between their respective values.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets of instructions executable by the one or more processors to:
determine a plurality of character encodings mapping sets of numbers to a plurality of characters in a language character set, the plurality of characters composed of a plurality of graphical units, different values of numbers in the sets of numbers corresponding to a different graphical unit of the plurality of graphical units, each particular character of the plurality of characters being mapped to a particular set of the sets of numbers having values corresponding to a set of graphical units used in composing the particular character; and
train a machine learning model using the plurality of character encodings, the machine learning model configured to perform optical character recognition of the language character set.

2. The computer system of claim 1, wherein the computer program code further comprises sets of instructions executable by the one or more processors to:
encode text to obtain encoded text using the plurality of character encodings, wherein the training of the machine learning model is further based on images corresponding to the text and the encoded text.

3. The computer system of claim 1, wherein the computer program code further comprises sets of instructions executable by the one or more processors to:
obtain an image of text based on the character set;
determine encoded text based on the image using the machine learning model; and
determine decoded text based on the encodings and the encoded text.

4. The computer system of claim 1, wherein the encodings are based on a Cangjie input method for entering Chinese characters into a computer using a keyboard, the plurality of graphical units corresponding to radicals of the Cangjie input method.

5. The computer system of claim 4, wherein each of the sets of numbers comprises six numbers, five numbers of the six numbers corresponding to five Cangjie radicals, one of the six numbers indicating a particular character encoded using the five numbers in a same order.

6. The computer system of claim 1, wherein the sets of numbers are ordered sets of numbers having an order indicating relative positions of graphical units in a particular ordered set.

7. The computer system of claim 6, wherein one or more of the ordered sets of numbers correspond to graphical units in relative positions that are not used in composing any particular character of the plurality of characters, the plurality of character encodings mapping the one or more of the ordered sets of numbers to respective closest characters of the language character set based on a distance between their respective values.

8. One or more non-transitory computer-readable medium storing computer program code comprising sets of instructions to:
determine a plurality of character encodings mapping sets of numbers to a plurality of characters in a language character set, the plurality of characters composed of a plurality of graphical units, different values of numbers in the sets of numbers corresponding to a different graphical unit of the plurality of graphical units, each particular character of the plurality of characters being mapped to a particular set of the sets of numbers having values corresponding to a set of graphical units used in composing the particular character; and train a machine learning model using the plurality of character encodings, the machine learning model configured to perform optical character recognition of the language character set.

9. The non-transitory computer-readable medium of claim 8, computer program code comprising sets of instructions to:

encode text to obtain encoded text using the plurality of character encodings, wherein the training of the machine learning model is further based on images corresponding to the text and the encoded text.

10. The non-transitory computer-readable medium of claim 8, computer program code comprising sets of instructions to:

obtain an image of text based on the character set;
determine encoded text based on the image using the machine learning model; and
determine decoded text based on the encodings and the encoded text.

11. The non-transitory computer-readable medium of claim 8, wherein the encodings are based on a Cangjie input method for entering Chinese characters into a computer using a keyboard, the plurality of graphical units corresponding to radicals of the Cangjie input method.

12. The non-transitory computer-readable medium of claim 11, wherein each of the sets of numbers comprises six numbers, five numbers of the six numbers corresponding to five Cangjie radicals, one of the six numbers indicating a particular character encoded using the five numbers in a same order.

13. The non-transitory computer-readable medium of claim 8, wherein the sets of numbers are ordered sets of numbers having an order indicating relative positions of graphical units in a particular ordered set.

14. The non-transitory computer-readable medium of claim 13, wherein one or more of the ordered sets of numbers correspond to graphical units in relative positions that are not used in composing any particular character of the plurality of characters, the plurality of character encodings mapping the one or more of the ordered sets of numbers to respective closest characters of the language character set based on a distance between their respective values.

15. A computer-implemented method, comprising:

determining a plurality of character encodings mapping sets of numbers to a plurality of characters in a language character set, the plurality of characters composed of a plurality of graphical units, different values of numbers in the sets of numbers corresponding to a different graphical unit of the plurality of graphical units, each particular character of the plurality of characters being mapped to a particular set of the sets of numbers having values corresponding to a set of graphical units used in composing the particular character; and training a machine learning model using the plurality of character encodings, the machine learning model configured to perform optical character recognition of the language character set.

16. The computer-implemented method of claim 15, further comprising:

encoding text to obtain encoded text using the plurality of character encodings, wherein the training of the machine learning model is further based on images corresponding to the text and the encoded text.

17. The computer-implemented method of claim 15, further comprising:

obtaining an image of text based on the character set;
determining encoded text based on the image using the machine learning model; and
determining decoded text based on the encodings and the encoded text.

18. The computer-implemented method of claim 15, wherein the encodings are based on a Cangjie input method for entering Chinese characters into a computer using a keyboard, the plurality of graphical units corresponding to radicals of the Cangjie input method.

19. The computer-implemented method of claim 15, wherein each of the sets of numbers comprises six numbers, five numbers of the six numbers corresponding to five Cangjie radicals, one of the six numbers indicating a particular character encoded using the five numbers in a same order.

20. The computer-implemented method of claim 19, wherein the sets of numbers are ordered sets of numbers having an order indicating relative positions of graphical units in a particular ordered set, wherein one or more of the ordered sets of numbers correspond to graphical units in relative positions that are not used in composing any particular character of the plurality of characters, the plurality of character encodings mapping the one or more of the ordered sets of numbers to respective closest characters of the language character set based on a distance between their respective values.

* * * * *